United States Patent [19]

Nicolai

[11] Patent Number: 4,770,033
[45] Date of Patent: Sep. 13, 1988

[54] METHOD AND APPARATUS FOR DETERMINING AND INDICATING THE QUANTITY OF A STORED LIQUID OR SOLID MATERIAL

[76] Inventor: Walter Nicolai, Maria-Louisen-Strasse 144, D-2000 Hamburg 60, Fed. Rep. of Germany

[21] Appl. No.: 929,300

[22] Filed: Nov. 12, 1986

[30] Foreign Application Priority Data

Nov. 16, 1985 [DE] Fed. Rep. of Germany ....... 3540768

[51] Int. Cl.$^4$ ........................ G01F 17/00; G01F 23/14
[52] U.S. Cl. ..................................... 73/149; 73/290 B
[58] Field of Search .............................. 73/149, 290 B

[56] References Cited

U.S. PATENT DOCUMENTS

| | | | |
|---|---|---|---|
| 1,508,969 | 9/1924 | Guichord | 73/290 B |
| 2,662,400 | 12/1953 | Weiner et al. | 73/149 |
| 2,667,782 | 2/1954 | Shea | 73/149 |
| 3,487,682 | 1/1970 | Whitehead, Jr. | 73/149 |
| 3,585,861 | 6/1971 | Keng | 73/149 X |
| 3,769,834 | 11/1973 | Fletcher et al. | 73/149 |
| 4,112,738 | 9/1978 | Turner | 73/149 X |
| 4,184,371 | 1/1980 | Brachet | 73/149 X |
| 4,535,627 | 8/1985 | Prost et al. | 73/149 X |

FOREIGN PATENT DOCUMENTS

617706 7/1978 U.S.S.R. ................................. 73/149

Primary Examiner—Tom Noland
Attorney, Agent, or Firm—Beveridge, DeGrandi & Weilacher

[57] ABSTRACT

The invention relates to a method for determining and indicating the quantity of a liquid or solid stored material contained in a container sealable with respect to the atmosphere or any other reference gas pressure, together with a residual volume of the gas interior representing the total volume less the stored product volume, the residual volume being increased and/or decreased after sealing the container by means of a displacer with a freely adjustable displacement size and shape arranged within the container and the resulting pressure change in the residual volume is determined as the measured value for the latter by means of the gas pressure measuring device permanently connected to the container gas zone, so that the corresponding apparatus can be produced with reduced costs and space requirements, has no special sealing problems and simultaneously satisfies at least the same requirements as regards accuracy of measurement and indication, response, adjustability and functional reliability as the known apparatuses and also without using additional external containers or precision pump cylinders and pistons ensures that the product stored in the container is reliably and accurately determined.

16 Claims, 5 Drawing Sheets

METHOD AND APPARATUS FOR DETERMINING AND INDICATING THE QUANTITY OF A STORED LIQUID OR SOLID MATERIAL

BACKGROUND OF THE INVENTION

The invention relates to a method and to an apparatus for determining and indicating the quantity of a stored liquid or solid material contained in a container sealable with respect to the atmosphere or any other reference pressure, together with an air, gas or vapor quantity filling the residual volume of the container interior, according to the preamble of claim 1.

Methods and apparatuses for measuring the quantity of a stored liquid or solid material in a container sealable with respect to the atmosphere or some other reference pressure in an intermittent manner by determining the volume or quantity of the gaseous container content by displacing the volume or the quantity of said content using Boyle's law are known in many different forms.

Thus, for example, in known constructions the increase and decrease of the container gas zone volume or the increase and decrease of the gas quantity in the container by means of a cylinder with piston and piston rod connected to the container gas zone by means of a connecting line with a pressure gauge. A pressure compensating device is provided between the cylinder chamber and the atmosphere in such a way that when the piston is extended to the maximum extent a connection is formed between the cylinder chamber and the atmosphere, so that pressure compensation is brought about between the container gas zone and the atmosphere. By inserting the piston in the cylinder the pressure compensating opening is separated from the container and consequently the container gas zone is sealed relative to the atmosphere. By reducing the gas-filled cylinder volume connected to the container gas zone, a further insertion of the piston leads to a pressure rise in the container interior. As this pressure rise is solely dependent on the size of the gas-filled zone and the gas quantity forced in through the piston, the pressure rise gives the volume of the container gas zone and therefore, when the total container volume is known, the stored product quantity filled into the container (German Pat. No. 897 331 and U.S. Pat. No. 1,508,969).

In the case of the aforementioned construction (German Pat. No. 897 331) and similarly acting construction forms and methods, the disadvantage arises that complicated, large-area or volume constructions are required, e.g. cylinder arrangements, additional containers and the like, in order to permanently obtain adequate accuracy of measurement by the principle of measuring the stored product quantity by determining the container gas zone volume or the gaseous content quantity. In addition, cylinder-piston systems must have a high degree of sealing on a long term basis to avoid measuring errors. An acceptable solution of this problem in the case of such arrangements can only be achieved with extremely high technical expenditure and effort, such as e.g. by ground cylinder pistons and walls. The use of cylinder and piston systems in aircraft and motor vehicles is very problematical for weight reasons and space deficiencies for the housing thereof, particularly if easily ignitable air-vapor mixture in the case of flammable liquids or toxic stored materials require an extreme sealing level of the cylinder-piston system. In addition, the space requirement with the piston inserted and extended is the same or even greater.

German Pat. No. 697 341 describes another known apparatus for determining the stored material quantity in a container temporarily sealed with respect to the atmosphere by measuring the pressure rise in the container gas zone through the supply of a gaseous measuring pressure medium. This apparatus fundamentally differs from the aforementioned apparatuses only in that the container gas zone is separated by a gas and liquid-tight, balloon-like, elastic envelope from the stored material, so as to ensure that no explosive gas-air mixture can form in said empty zone. The effective volume of this inflatable envelope changes with the quantity of liquid stored. The envelope must at least be sufficiently large that it can fill the complete container interior in the inflated state and with the container empty.

In the case of said apparatus, apart from the disadvantages of the previously described apparatuses, there is also the additional expenditure of having to incorporate or fit an envelope in the container and whose dimensions, particularly internal dimensions must largely correspond to the container shape.

SUMMARY OF THE INVENTION

The problem of the present invention is to so improve a quantity measuring method of the aforementioned type that the corresponding apparatus can be manufactured with reduced economic expenditure and space requirements, has no special sealing problems and simultaneously at least satisfies the same requirements with respect to accuracy of measurement and indication, response, adjustability and functional reliabilty as the known apparatuses and which, without using additional external containers or precision pump cylinders and pistons, makes it possible to reliably determine the container gas zone volume and therefore in known manner the quantity of liquid or solid material stored in the container.

According to the invention this problem is solved by the method measures of claim 1. An apparatus for performing the inventive method is given in claim 3.

The invention is based on the use of the fact that according to Boyle's law $V_1 \cdot P_1 = V_2 \cdot P_2$, assuming an isothermal course, in the case of a container sealable against the atmosphere or any other reference pressure following the sealing of the container, a change to the displacement quantity of one or more hollow bodies (displacers) arranged within the container brings about a change to the container gas zone volume and therefore to a pressure change in said zone as a reference quantity for the container gas volume. In the case of adequately high temperatures and adequately low pressures, Boyle's law is fulfilled by virtually all substances in gaseous or vaporous form with a good and often very good approximation, particularly as a rule it can be assumed that the temperature of the container interior is kept largely constant through the heat exchange with the ambient.

With regards to the pressure and temperature values normally obtained in the present field air e.g. behaves substantially in the manner of an ideal gas and in the case of an adequately small pressure and adequately high temperature water, mineral oils, gasoline, etc. in vaporous form also behave as ideal gases.

The function of the apparatus for performing the method is ensured both in the case of containers intermittently sealable with respect to the atmosphere or any other pressure of any size and shape for the storage or transportation of easily flammable, toxic or non-critical neutral liquids or solids and in the case of pipelines temporarily tightly sealable on either side with respect to the atmosphere or any other reference pressure and whose empty volume is to be determined over long distances, e.g. in the case of long-distance gas or oil pipelines.

This displacer with freely adjustable displacement size and shape and which serves to increase and/or decrease the container gas volume—also called residual volume—after sealing the container is placed within the latter. It is gas and liquid-tight with respect to the container interior and its displacement size can be increased and/or decreased by means acting mechanically, pneumatically or hydraulically thereon.

The gas pressure measuring device permanently connected to the container gas zone residual volume thereby determines the pressure change between the initial measured pressure value prior to sealing the container with respect to the atmosphere or any other pressure (in the case of rest volume size of the displacer) and the measured final pressure value after sealing the container with respect to the aforementioned reference pressure (in the case of working volume size of the displacer). The rest volume size of the displacer can be both the empty volume and the maximum displacement volume and the working volume size can both be the empty volume and the maximum displacement volume. If the rest volume size of the displacer is the empty volume and the working volume size the maximum displacement volume, then the apparatus according to the invention functions according to the overpressure process. However, if the rest volume size of the displacer is the maximum displacement volume and the working volume size the empty volume, then the apparatus according to the invention operates according to the underpressure or vacuum process.

The pressure change determined by the gas pressure measuring device between the initial measured pressure value before sealing the container and the final measured pressure value, as a consequence of the displacement size change of the displacer, after sealing the container represents the measured value for the size of the residual volume.

The solid or liquid stored material quantity in the container is obtained by simply subtracting the residual volume from the known container capacity. This simple mathematical operation can e.g. be performed by electronic computers constructed in a discrete or integrated manner, or also by microcomputers, which can simultaneously monitor, correct and control the control of the increase and/or decrease of the residual volume by means of the displacer size change, the control of the container sealing and opening processes and the interrogation of the pressure states in the container gas zone or residual volume and passes the results of the mathematical operations to a display unit. In order to largely eliminate measuring errors of the gas pressure measuring device by zero and sensitivity drift, as well as by temperature and other influences, according to a further development of the apparatus for performing the method, the invention provides that before the sealing of the container with respect to the atmosphere or any other reference pressure, the measured value of the gas pressure measuring device is compared by means of per se known electronic computers with a calibration value (e.g. atmospheric pressure) and the divergence of the measured value from the calibration value is stored as a correction value and that after sealing the container with respect to the atmosphere or any other reference pressure and subsequent pressure change in the residual volume as a result of the size change of the displacer the measured value of the gas pressure measuring device is corrected in per se known manner by the stored correction value using electronic computers and is only then used for calculating the residual volume.

The displacer sealed in gas and liquid-tight manner with respect to the container interior is preferably one or more, flexible volume-variable hollow bodies of predetermined empty and full volume with at least one opening for the connection of a pressure and/or vacuum source and/or the pressure compensating line.

According to an advantageous embodiment the hollow body is constructd as an inflatable, small empty volume unfoldable and refoldable tubular film closed at both sides in stored material-tight manner and is surrounded by a dimensionally stable, completely or partly gas and liquid-permeable envelope having a constant capacity or dry measure. The hollow body is fixed or movable relative to said envelope, e.g. in conjunction with a vertical pivoting or sliding device or is also arranged in floating manner (e.g. on liquid stored material) in the container interior. In the inflated state, it engages on the inner wall of the envelope, whereas it reassumes its empty volume after pressure compensation with respect to the initial pressure and prior to inflation.

The inflation or unfolding process and the restoring or refolding process ot give the empty volume is brought about by pneumatic means, e.g. an air pump. It is also possible to mechanically refold the hollow body. The use of a flexible hollow body made from expansible tubular film or other flexible blister material as the displacer is also possible, if it is ensured that during the inflation process the film cannot be pressed into the passage openings of the envelope, which would falsify the displacement size. As a result of correspondingly small passage openings (e.g. sieve-like holes) in the envelope, the pressing in of the film can be largely prevented. It is also possible to mechanically unfold expansible or non-expansible films.

The envelope can be constituted by a solid or flexible, gas and liquid-permeable, tubular structure (e.g. tubes with wall bores or tubular sieves or metal or plastic spiral hoses with wall bores), whose open ends, apart from the opening or openings for the inflating and/or pressure compensating line or lines are provided with a tight or gas and liquid-permeable sealing wall and are arranged in fixed manner within the container either mechanically or magnetically (e.g. by means of holding magnets in magnetic material containers). The arrangement of the fixed envelopes can take place both in the upper part of the container and in the vicinity of its base, or between these positions. In the case of containers for solid, granular or pulverulent stored materials, it is advantageous to place the envelope in the upper stored material-free part of the container, because otherwise the gas permeability of the envelope wall is not ensured.

Advantageously it is possible to e.g. provide a vertical pivoting or sliding device of known type in the container interior, which is on the one hand fixed to the container and on the other to the inflatable hollow body or the envelope surrounding the latter acting as the displacer, in such a way that in the case of filling level changes relative to the stored liquid material the hollow body exercises its displacement function in the residual volume (gas zone) of the container.

If the displacer is constructed as a non-expansible, inflatable, small empty volume hollow body, e.g. as a non-expansible, but unfoldable and refoldable, stored material-tight tubular foil sealed at both sides with incorporated fabric in the tube wall and which in the inflated state always has the same displacement volume due to its non-expansibility and after pressure compensation with respect to the external pressure prior to inflation reassumes its empty volume, there is no need for an additional envelope for the hollow body. The hollow is fitted in fixed manner, preferably in the upper part of the container interior, or movable manner, e.g. floating on the liquid stored material and is only arranged and fixed with the flexible, but stable inflating and pressure compensating line, preferably in the upper part of the container interior.

The inflating or unfolding process and the resetting or refolding process to the empty volume in the case of pressure compensation is brought about by pneumatic means (e.g. an air pump) or hydraulic means (e.g. a liquid pump).

In a further advantageous embodiment of the displacer, it is constructed as a hollow body, so as to be axially expansible in one working direction and non-expansible at right angles to the working direction, e.g. it is constructed telescopically or as a bellows. This hollow body performs its longitudinal movements in a mechanical and/or magnetic (guided in contact-free manner) sliding and guiding arrangement, which is fitted in a fixed or movable manner, e.g. in conjunction with a preferably vertical pivoting device in the container interior and preferably in the upper part thereof. Mechanical and magnetic sliding and guiding arrangements for objects, which have to be moved backwards and forwards and guided longitudinally are known. The unfolding or refolding process for the hollow body can be brought about by known mechanical, pneumatic, e.g. blower pump, or hydraulic means. The magnitude of the longitudinal movement can be controlled by known control engineering means, e.g. by optically or magnetically acting displacement transducers with stepping motor drive or by solenoid switches, which are fitted at fixed intervals on the sliding and guiding arrangement and during the expansion process are switched by means of a permanent magnet fixed to the top of the expansible hollow body, e.g. bellows and release control signals, which in per se known manner put the e.g. inflation pump into operation until a predetermined control point of the top of the hollow body or bellows is reached and then the pump is switched off.

The displacement quantity or size of the displacer in the inflated state is dependent on the container size and the maximum permitted filling level of the container, because liquid or solid stored material cannot be compressed. Thus, limits are placed on the maximum displacer size and on the accuracy of measurement when only one displacer is placed in the container, because in the case of an excessive displacement volume and a container filled up to the maximum permitted fill level, said displacer in the inflated state would either force stored material out through a poorly closing filling closure or would in certain circumstances deform the container. Therefore, according to the invention, several displacers of the same or different displacement magnitude are arranged in a container and their function is controlled in filling quantity or fill level-dependent manner in such a way that e.g. in the case of a container filled up to the maximum permitted filling level initially only one displacer is put into operation and during the emptying, or as a function of the degree of filling of the container, operationally further displacers are connected in whilst simultaneously switching over the measuring ranges of the gas pressure measuring device or the downstream connected electronic computers. This range switch over is necessary due to the change in the volume conditions of residual volume to total volume of the in each case inflated displacer during the measuring process. During the filling of the container and during the filling quantity or fill level-dependent range switch over, the displacers are disconnected again in the reverse order.

In the case of overpressure and underpressure processes unfolding and possibly also the refolding of the displacer constructed as an inflatable hollow body is advantageously brought about by means of an air pump through the appropriate connection of the pressure and suction connections thereof to the inflating and pressure compensating line or lines. If there is only one hollow body connection or opening with a common inflating and pressure compensating line, e.g. the pressure or suction connection of the air pump can be connected by means of two adjustable three-way valves to the inflating (or) and pressure compensating device or atmosphere or any other reference pressure and namely the pressure connection during inflating or unfolding and the suction connection during resetting or refolding of the hollow body or displacer.

In the case of highly flexible hollow bodies, the resetting or refolding process can take place without any additional exhausting of the gas or air filling in the hollow body, if the common inflating and pressure compensating line is e.g. connected via an adjustable three-way valve to the atmosphere or other reference pressure.

In the overpressure process the inflating of the hollow body by means of the air pump preferably only takes place after sealing the container, whilst in the underpressure or vacuum process it is only after pressure compensation between the container and the atmosphere or other reference pressure. In the overpressure process, the inflating process can also take place simultaneously with the sealing of the container, or in the underpressure process at the start or shortly after pressure compensation between container and atmosphere or any other reference pressure.

The putting into operation of the air pump can e.g. take place both by manual control and also automatically in known manner by an electronic or similarly acting program flow control, e.g. by means of a microcomputer.

The switching off of the air pump can e.g. take place both in time-dependent manner by a time switching element, which starts on putting the air pump into operation and drops out at the end of its running time, thereby separating the air pump circuit, and also in pressure-dependent manner with respect to the pressure in the hollow body interior by means of a pressure switch of knonw construction (overpressure and/or underpressure switch) arranged in the inflating line or in an additional hollow body connection. However, this pressure switch cannot automatically switch on the air pump if no switch-on clearance has not been given by another means, e.g. a microcomputer. All the aforementioned switching processes can be monitored and controlled by a microcomputer.

The pressure compensation between the container gas zone or residual volume and the atmosphere or other reference pressure takes place by opening the valve for sealing the container, after the interrogation of the pressure in the container gas zone in the case of "working volume size" of the displacer using the gas pressure measuring device and the passing on thereof to the evaluation unit (e.g. a discrete electronic computer or microcomputer).

In a further embodiment of the invention, the displacer is constructed as a vibrator, which is periodically pressurized, connected in gas and liquid-tight manner with respect to the container interior and connected directly or indirectly (e.g. via a buffer liquid) to the atmosphere or other reference pressure, said vibrator performing forced vibrations of constant amplitude and in the case of a sealed container due to its vibratory movements in the container interior increases and/or decreases the residual volume (as a function of the course of the vibrations with respect to the central position of the vibrator when the container is not closed) and therefore brings about pressure changes in the container gas zone as a measured residual volume value.

The vibrator is preferably constituted in known manner by mechanically (e.g. by an electric motor with cam), pneumatically (e.g. by a momentum-air vibrator) or electrically (e.g. by means of a swinging lever or moving coil) driven, gas and liquid-tight diaphragm made from flexible or rigid material, which is so arranged in the container wall, a container cover (e.g. dome cover) or completely in the container interior that only one side of the diaphragm is in contact with the medium within the container and preferably only with the medium in the container gas zone, whilst the other diaphragm side is only in contact with the atmosphere or other reference pressure, e.g. via a tube or hose connection. The periodic vibrating drive (diaphragm drive) can be sinusoidal or in any other freely adjustable vibration mode, e.g. as a positive or negative sine half-wave or in pulse-like manner.

Known technical means can ensure that the amplitude, vibration mode and vibration frequency of the forced vibrations of the vibrator, e.g. the diaphragm remain constant, unless they have to be changed for switching over the measuring range or for other reasons.

The periodic pressure changes in the container gas zone brought about by the vibrator with the container sealed are detected by the gas pressure measuring device constantly connected to the container and converted into electrical quantities, despite their relatively small amplitudes occurring more particularly in larger containers. These electrical measuing quantities are a criterion of the container residual volume and after further working up, e.g. rectification in known manner are supplied to an analog-digital converter and either directly indicated of a scale calibrated in volume units or pass to an electronic computer or microcomputer for determining the stored material quantity in the container.

When using the apparatus for performing the method on a pipeline temporarily sealable on either side the displacer used for reducing and/or increasing the pipeline inner zone is arranged within the pipeline with a freely adjustable displacement size and shape. It is gas and liquid-tight with respect to the pipeline interior. Its displacement size can be increased and/or decreased by means acting pneumatically (e.g. by means of an air pump) or hydraulically (e.g. by means of a liquid pump) thereon.

Preferably the displacer is constructed as a small empty volume, non-expansible hollow body with at least one opening for connecting the pressure and/or vacuum source and/or the pressure compensating line or connection, e.g. as a non-expansible tubular film closed at both sides and which is transportation product-tight (due to transportation product-contaminated pipe walls), whilst having an incorporated fabric or an equivalent strengthening material, which in the inflated state always has the same volume due to its expansibility and which reassumes its empty volume after pressure compensation with respect to the initial pressure and prior to inflation.

It is particularly advantageous to make the length dimension of this tubular film closed on two sides and serving as a displacer such that the tubular film extends from one end of the pipeline to the other and, as required, is fixed to one or both pipeline ends, where the inflating opening or line, or the pressure compensating line is positioned. The inventive function of the displacer is, still, ensured in the case of shorter length dimensions of the tubular film.

The introduction of the tubular film into the pipeline prior to the measurement can take place e.g. by means of a torpedo-like moving or sliding body (scraper), which can move its own drive or an external drive in the pipeline and such as is regularly used for pipeline-internal control and cleaning purposes.

BRIEF DESCRIPTION OF THE DRAWINGS

The invention is described in greater detail hereinafter relative to non-limitative embodiments and the attached drawings in highly simplified vertical sectional representational form, wherein show.

DETAILED DESCRIPTION OF THE PREFERRED EMBODIMENTS

Figure 1:
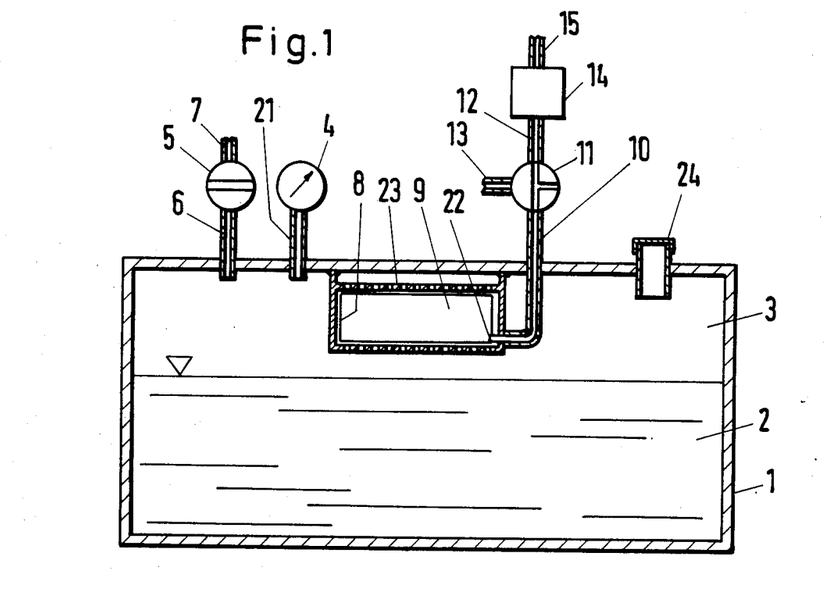
FIG. 1 An apparatus with a displacer having a maximum displacement volume and which is constructed as an inflatable, non-expansible hollow body and which is surrounded by a rigid envelope fixed in the container interior.

In FIG. 1 are shown the basic elements for performing the inventive process in a container 1 tightly sealed with respect to the atmosphere by means of shut-off valve 5 and which contains stored liquid material 2. This is an overpressure process. In the container gas zone 3, i.e. the so-called residual volume, the inflatable, non-expansible, but very flexible hollow body 8 constituting the displacer is surrounded by the dimensionally stable, gas and liquid-permeable envelope 23 having a constant dry capacity. The envelope is fixed to the upper inner container wall in the container gas zone 3. Air pump 14 inflates the inner area 9 of hollow body 8 via suction line 15, pressure line 12, three-way valve 11, inflating the pressure compensating line 10 and hollow body opening 22, so that the hollow body 8 has completely unfolded and now, as shown, engages on the inner wall of envelope 23.

It is possible to read from the pressure gauge 4, the measured value of the pressure increase in the container gas zone as a result of the volume increase of hollow body 8 due to the inflation process and the resulting decrease in the residual volume compared with the initial pressure with the container unsealed. The indicated pressure change is the measured value of the residual volume. Pressure gauge 4 is constantly connected to the container gas zone 3 via line 21. In the open state, shut-off valve 5 is connected to the atmosphere via line 7 and to the container gas zone via line 6. In the representation according to FIG. 1, the connection is interrupted by shutting off valve 5, so that the container 1 is tightly sealed with respect to the atmosphere.

On reversing the three-way valve 11 after completing the pressure change measuring process, the pressure compensation connection 13 is used for compensating the pressure in the interior 9 of hollow body 8 with respect to the atmosphere. As in the representations of FIGS. 2 to 7, filling connection 24 is tightly sealed.

Figure 2:
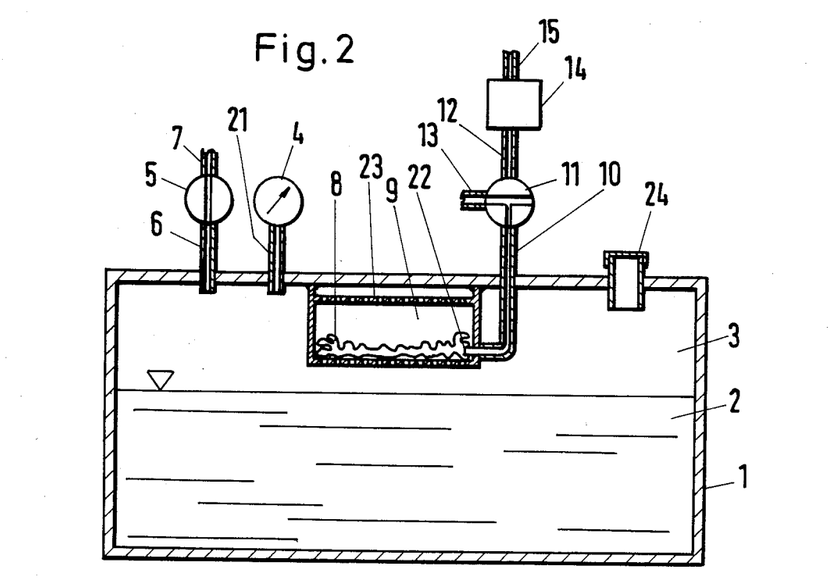
FIG. 2 The apparatus according to FIG. 1, the displacer having an empty volume.

FIG. 2 shows the same inventive apparatus of the embodiment according to FIG. 1, but with the difference that what is shown here is the state after pressure compensation and after terminating the measuring process, the shut-off valve 6 and three-way valve 11 being reversed in such a way that on the one hand the container gas zone 3 is connected continuously to the atmosphere via connecting lines 6, 7, so that atmospheric pressure prevails there, and on the other hand the interior 9 of hollow body 8 is connected to the atmosphere via hollow body opening 22, inflating and pressure compensating line 10, three-way valve 11 and pressure compensation connection 13. The resulting pressure compensation between the hollow body interior 9 and the atmosphere brings about a refolding of the highly flexible hollow body 8, which consequently asumes its rest empty volume and the residual volume is again increased to its original amount at atmospheric pressure. The pressure gauge 4 indicates zero in the case of a refolded hollow body 8 if the atmospheric pressure is set as the calibration pressure.

Figure 3:
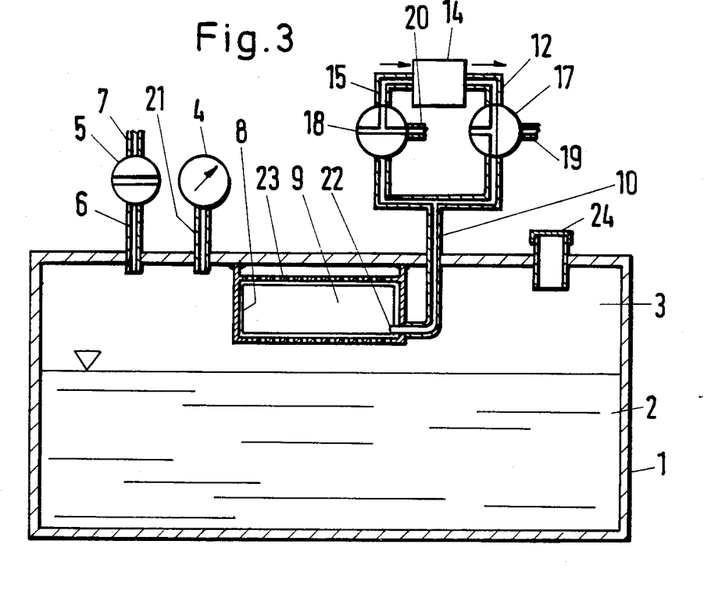
FIG. 3 Another embodiment of the apparatus, the displacer having a maximum displacement volume and an additional three-way valve means is provided for improving the pressure compensation.

In order to ensure that the refolding process of the inflatable, non-expansible hollow body 8 takes place rapidly and thoroughly, a further advantageous embodiment of the invention is provided and is shown in FIG. 3. Here again it is an apparatus operating with an overpressure process. Differing from the embodiment according to FIGS. 1 and 2, the single three-way valve between air pump 4 and the interior 9 of hollow body 8 is replaced by two three-way valves. The interior 9 of hollow body 8, in the case of a sealed container 1, is inflated by air pump 14 via pressure line 12, three-way valve 17, inflating and pressure compensating line 10 and hollow body opening 22. Air pump 14 is connected on the suction side via the suction line or connection 15, three-way valve 18 and the pressure compensating connection 20 to the atmosphere. As a result of the inflation process hollow body 8 engages in fully folded out manner with the inner wall of envelope 23. It is now possible to read from pressure gauge 4 the measured value of the pressure change in the container gas zone 3 as a result of the volume increase of hollow body 8 caused by the inflation process and the resulting decrease in the residual volume compared with the initial or atmospheric pressure with the container unsealed and constituting the measured value of the residual volume. The shut-off valve 5 is blocked during the inflation process and up to the end of the measuring process.

Figure 4:
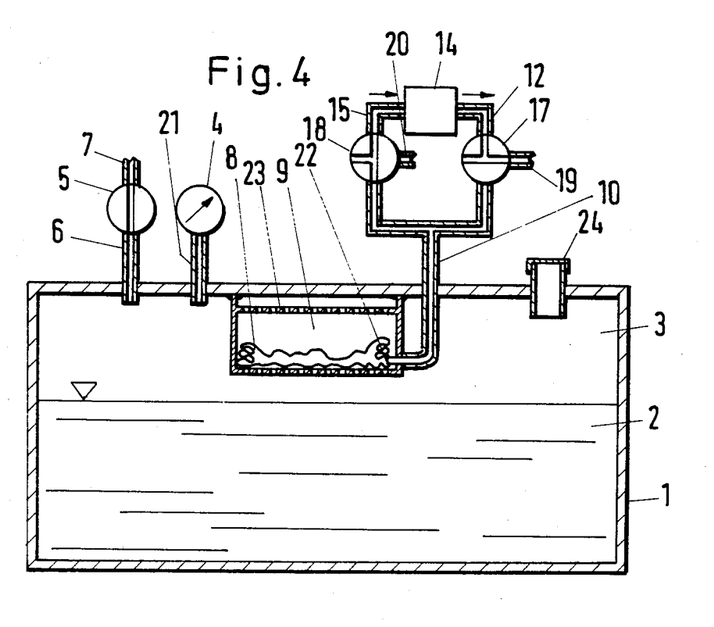
FIG. 4 The apparatus according to FIG. 3, in which the cut-off valve and three-way valve are switched over and the displacer has an empty volume.

FIG. 4 shows the same embodiment as FIG. 3, but with the difference that in this case the pressure compensating process following the measuring process is shown and the shut-off valve 5 and three-way valves 17, 18 have been revervsed. By opening the shut-off valve 5, the container gas zone 3 is now freely connected to the atmosphere across connecting lines 6, 7. The interior 9 of hollow body 8 is also connected via hollow body opening 22, inflating and pressure compensating line 10, three-way valve 18 and suction line 15 to air pump 14. Pressure line 12 of air pump 14 is connected via the reversed three-way valve 17 and its pressure compensation connection 19 to the atmosphere. Air pump 14 is in operation through a time-dependent or pressure-dependent use control (not shown) until the total folding back of hollow body 8 has been obtained and it has consequently reached its rest empty volume. Thus, the residual volume has also returned to its original magnitude (atmospheric pressure), i.e. has been increased. When the hollow body is refolded, pressure gauge 4 is at zero if set to atmospheric pressure as the calibration pressure.

Figure 5:
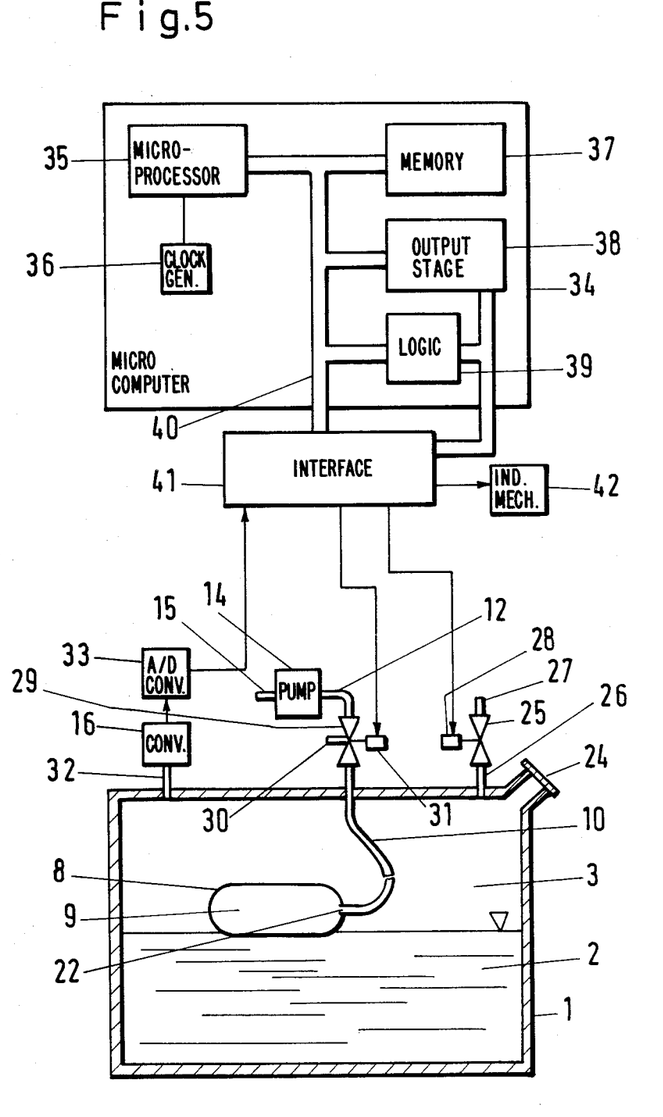
FIG. 5 Another embodiment of the apparatus with an inflatable, non-expansible displacer arranged in floating manner in the stored material, in conjunction with a microcomputer.

FIG. 5 shows an advantageous embodiment of the inventive apparatus with functioning similar to that of FIGS. 1 and 2, in conjunction with the microcomputer 34 as the means for the program run control of the inflation and pressure compensating processes, the measuring program, the correction of the pressure measurement divergences by temperature, drift or other influences, together with the monitoring of the correct performance of the program fed into the wokring memory 37 of the microcomputer. Liquid 2 introduced by means of the gas-tight, closed filling connection 24 is stored in sealable container 1. The displacer, here constructed as a non-expansible, inflatable hollow body 8 without an enevelope, floats on the stored liquid 2 in the gas zone 3 of container 1. The interior 9 of hollow body 8 is connected by means of the hollow body opening 22 and the in this case flexible inflation and pressure compensating line 10 to the three-way solenoid valve 29. As a function of the program status, the interior 9 of hollow body 8 by reversing the three-way valve 29 is either (during the inflation process) connected via pressure line 12 to air pump 14 or via the pressure compensation connection 30 (during the pressure compensation process) to the atmosphere.

The drive of the three-way solenoid valve 29 is controlled in programmed manner by microcomputer 34 via interface 41, which also contains the electronic driver stages for the power control of the solenoid 31. The shut-off solenoid valve 25, whose solenoid 28 is also controlled by the microcomputer via interface 41 is used for blocking during the inflation and measuring process the connection between container gas zone 3 and the atmosphere existing during the valve open state.

The pneumatic part of the gas pressure measuring device 16, e.g. a pressure/voltage converter, a pressure/current converter or a pressure/frequency converter is constantly connected via line 32 to the container gas zone 3, whilst the electrical part of the gas pressure measuring device is connected to the downstream analog/digital converter 33. The measured output values of converter 33 are passed in digital form via interface 41 to microcomputer 34, which both brings about corrections of the divergences determined during the measurement of the pressure state in container gas zone 3 during its connection to the atmosphere, and also all the mathematical operations necessary for the performance of the inventive process. The operating times of air pump 14 are also controlled in programmed manner by microcomputer 34 via interface 41. Working memory 37 of microcomputer 34 contains both the program memory containing the user program in fixed form and which is therefore secured against power failure, together with a data memory, in which the informations constantly change. The microprocessor (MPU or CPU) 35, which is timed by the clock generator 36, performs in the indicated manner all the necessary mathematical operations, whilst the control unit in known manner ensures the performance of the operating instructions. 38 is the output stage for the control processes of the inventive apparatus and 39 is the additional logic for additional peripheral functions. However, the additional logic is unnecessary for the inventive function. Data bus 40 connects microcomputer 34 to interface 41. The significance of 12, 14 and 15 has already been described in conjunction with the apparatus of FIG. 1. The indication of the determined stored product quantity takes place by means of the quantity indicating mechanism 42 and in this case is digital. However, it can obviously also be in analog form.

Figure 6:
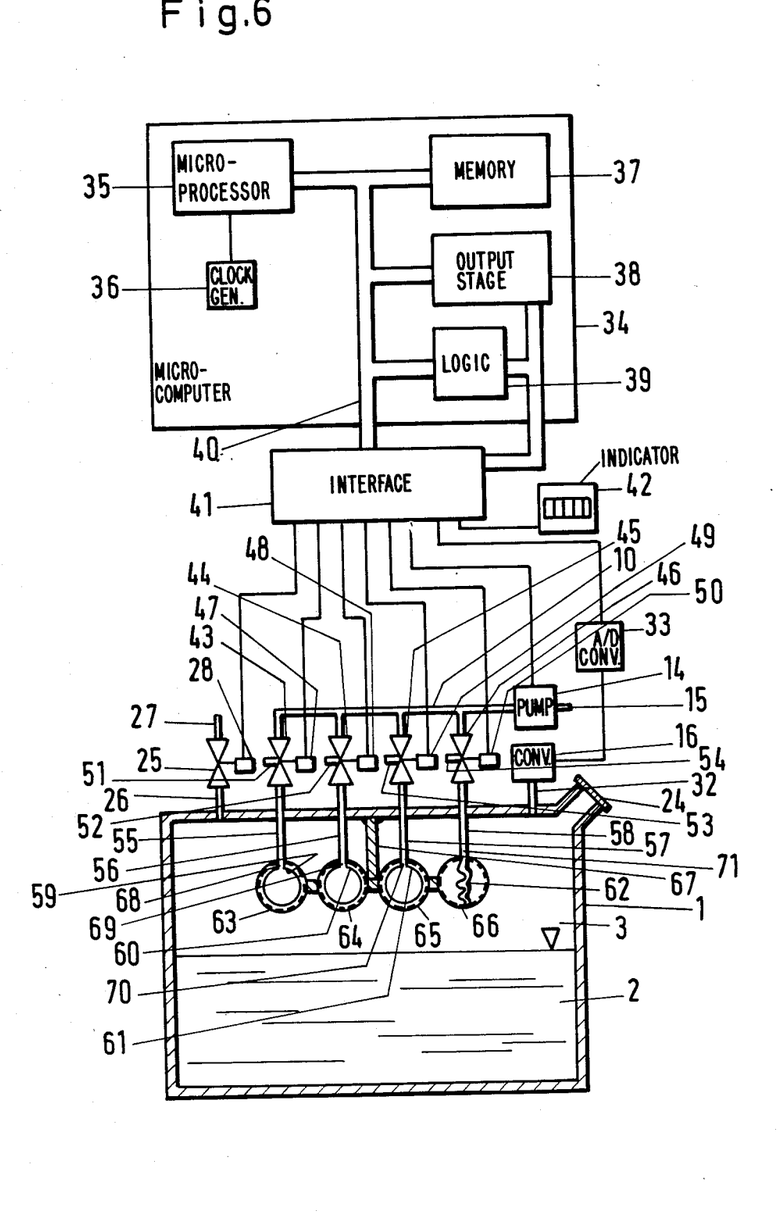
FIG. 6 Another embodiment of the inventive apparatus with in each case four inflatable, non-expansible displcers fixed in the container interior and surrounded by envelopes, in conjunction with a microcomputer.

FIG. 6 shows another advantageous further development of the embodiment of FIGS. 1 and 2 in conjunction with the microcomputer 34, which fulfils the same functions to those described in connection with FIG. 5. In this case there are several hollow bodies as displacers and in each case have the same displacement magnitude, being in each case surrounded by envelopes. The displacers are arranged in container 1, whose displacement function is controlled in filling quantity of fill level-dependent manner by the program fed into the microcomputer and as a function of the container filling level one or more displacers are switched in or out, whilst simultaneously switching over the measuring ranges of the gas pressure measuring device or the calculating unit in microcomputer 34. Shut-off valve 25, whose solenoid 28 is also controlled by microcomputer 34 via interface 41 is used for shutting off the connection between the container gas zone 3 and the atmosphere which exists via line 26 and line 27 in the valve open state during the inflation and measuring process.

The inflatable hollow bodies 59, 60, 61 and 62 are arranged within the gas and liquid-permeable envelopes 63, 64, 65 and 66. In this case hollow bodies 59, 60 and 61 are fully inflated by means of their hollow body openings 68, 69 and 70, whilst hollow body 62 is still connected to the atmosphere via its hollow body opening 71 and remains in the empty volume state. All the envelopes are rigidly fixed as a constructional unit to the common carrier 67 at the top of the inner wall of container 1. Hollow body openings 68, 69 and 70 are connected on the pressure side to air pump 14 via inflating and pressure compensating lines 55, 56, 57, three-way solenoid valves 43, 44, 45 and the common inflating and pressure compensating line 10.

The suction line 15 of air pump 14 is connected to the atmosphere. The hollow body opening 71 of the hollow body 62 in the refolding state at empty volume size is connected to the atmosphere via inflating and pressure compensating line 58, three-way solenoid valve 46 and pressure compensating connection 54. Hollow bodies 59, 60, 61, 62 can also be constructed as inflatable, non-expansible hollow bodies requiring no envelopes and can float on the stored liquid, in the case of a stored liquid material.

The drive of the three-way solenoid valves 43, 44, 45, 46 is controlled by microcomputer 34 via interface 41, which also contains the electronic driver components for the power control of solenoids 47, 48, 49 and 50. The pneumatic part of the gas pressure measuring device 16 is constantly connected via line 32 to the container gas zone 3, whilst the electrical part thereof is connected to the downstream analog/digital converter 33. The measured output values of the latter are passed via interface 41 to microcomputer 34, which in known manner performs the same functions described hereinbefore in connection with FIG. 5. In addition, the number of fill level or filling quantity-dependent hollow bodies to be inflated, vented or to reamin in the empty volume is determined by microcomputer 34 and controlled in accordance with the invention whilst taking account of the measured filling quantities of the stored material or the measured values of a not shown, simple fill level measuring device. The indication of the determined stored material quantity takes place by means of the quantity indicating device 42.

Figure 7:
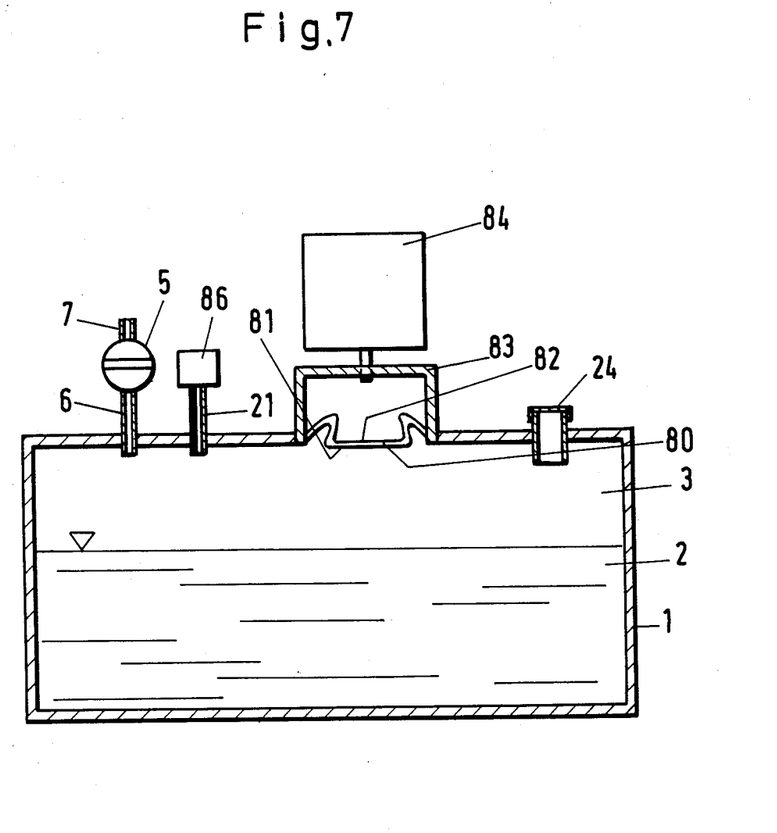
FIG. 7 Another embodiment.

FIG. 7 shows another advantageous embodiment of the invention, in which the displacer sealed in gas and liquid-tight manner with repsect to the container interior is constructed as a diaphragm 80 which periodically performs forced vibrations and whereof one vibrating face 81 only has contact with the medium in the container gas zone 3 and whose other facing face 82 only has contact with the control gas in pressure zone 83. The control gas is subject to the action of the momentum-air vibrator 84, so that in each case the residual volume in zone 3 is varied in accordance with the vibrations of diaphragm 80. The momentum-air vibrator 84 constructed as a periodic vibrator drive can drive the disphargm 80 sinusoidally or in some other freely adjustable vibration mode (e.g. as a positive or negative sine half-wave or in pulse-like manner). The operation of the displacer constructed as a diaphragm 80 corresponds to that described hereinbefore. A pressure measuing device 86 is provided for determining the pressure.

By means of overpressure and/or underpressure safety valves arranged in the inflating and pressure compensating line, it is possible to prevent damage to the hollow body constituting the displacer. It can also be advantageous to use an air pump with a container as the compressed air source, in order to speed up the inflation process.

What is claimed is:

1. A method for determining the quantity of a liquid or solid product stored in a container of known volume comprising:
opening a first valve of a first line, said first line communicating at one of its ends with a gas contained within a gas zone in said container and at the other of its ends with a reference gas of known reference pressure, and thereby allowing the pressure of the gas in said gas zone to become essentially the same as the pressure of said reference gas;

closing said first valve so as to completely seal off said container;

measuring the pressure of the gas in said gas zone with a pressure measuring device;

positioning a second valve of a second line, with said second line communicating at one of its ends with fluid pumping means and at the other of its ends with at least one inflatable hollow body completely enclosed within said container, so that fluid can pass from said fluid pumping means through said second valve and into said at least one inflatable hollow body;

completely inflating with said fluid pumping means said at least one inflatable hollow body to a predetermined volume;

measuring with said pressure measuring device the new pressure of the gas in said gas zone which results from the reduction in volume of said gas zone;

determining the initial volume (V1) of gas in the gas zone by utilizing Boyle's law of $(P1 \cdot V1 = P2 \cdot V2)$, where (P1) represents the measured pressure of the gas in the gas zone after said first valve is closed and before said second valve is positioned so as to allow the fluid to flow from said fluid pumping means to said at least one hollow body, (P2) represents the measured pressure of the gas in the gas zone after said hollow body is inflated to the predetermined volume, and (V2) is equal to the initial volume of the gas zone (V1) minus the predetermined volume displaced by said at least one inflatable hollow body upon complete inflation thereof;

determining the volume of stored product in said container by taking the difference between the known volume of said container and the determined volume (V1) of the gas zone in said container;

positioning said second valve to a second position so as to allow the fluid to escape from said at least one inflatable hollow body to a lower pressure area.

2. A method according to claim 1 further comprising comparing a measured value of said pressure measuring device with a calibration value, storing the difference between the measured value and the calibration value as a correction value, correcting the measured presure of the gas in the gas zone with the stored correction value, and using the corrected measure pressure in determining the volume of the gas zone, with the comparing and the correcting being done by an electronic computer.

3. A method for determining the quantity of a liquid or solid product stored in a container of known volume comprising:

opening a first valve of a first line, said first line communicating at one of its ends with a gas contained within a gas zone in said container and at the other of its ends with a reference gas and thereby allowing for the pressure of the gas in said gas zone to become essentially the same pressure as said reference gas;

positioning a second valve of a second line, said second line communicating at one of its ends with fluid pumping means and at the other of its ends with at least one inflatable hollow body completely enclosed within said container, so as to allow fluid to pass from said fluid pumping means through said second valve and into said at least one inflatable hollow body;

completely inflating, with said fluid pumping means, said at least one inflatable hollow body to a predetermined volume;

closing said first valve so as to completely seal off said container;

measuring the pressure (P1) of the gas in said gas zone with a pressure measuring device;

positioning said second valve to a position which allows the fluid in said at least one hollow body to completely escape to a lower pressure area;

measuring with said pressure measuring device the new pressure (P2) of the gas in said gas zone which results from the increase in volume of said gas zone;

determining the resultant volume (V2) of the gas in the gas zone by utilizing Boyle's law of $(P1 \cdot V1 = P2 \cdot V2)$, where the resultant volume (V2) of the gas in the gas zone is equal to the volume (V1) of the gas in the gas zone when said at least one hollow body is completely inflated to the predetermined volume plus the predetermined volume displayed by said at least one inflatable hollow body upon complete inflation thereof;

determining the volume of stored product in said container by taking the difference between the known volume of said container and the determined volume (V2) of the gas zone in said container.

4. A method according to claim 3 further comprising comparing a measured value of said pressure measuring device with a calibration value, storing the difference between the measured value and the calibration value as a correction value, correcting the measured pressure of the gas in the gas zone with the stored correction value, and using the corrected measured pressure in determining the volume of the gas zone, with the comparing and the correcting being done by an electronic computer.

5. An apparatus for determining the quantity of a liquid or solid product stored in a container of known volume comprising:

a container having a known interior volume and filling means for insertion of a liquid or solid product for storage in said container;

a first gas line extending into said container and having a first end in fluid communication with a gas zone within said container and a second end in fluid communication with a reference gas at a reference pressure;

a shut off valve in said first line;

a pressure measuring device for measuring the pressure of the gas in the gas zone of said container;

volume displacing means including at least one inflatable, hollow body completely enclosed within the gas zone of said container, said volume displacing means having a predetermined volume upon complete inflation of said at least one inflatable hollow body;

a second gas line extending into said container and having a first end in fluid communication with said at least one hollow body and having a second end;

fluid pumping means in fluid communication with said second gas line second end for inflating said at least one hollow body;

at least one valve device located in said second line and having a first setting adapted to block fluid communication from the fluid pumping means to said at least one hollow body and to place the second line in fluid communication with a lower pressure area, and a second setting adapted to provide fluid communication between said fluid pumping means and said at least one hollow body.

6. An apparatus as recited in claim 5 wherein said inflatable hollow body is formed of a non-expansible material, thereby ensuring a fixed volume upon maximum inflation.

7. An apparatus according to claim 5, wherein said second gas line comprises a pressure line, an inflation and pressure compensation line and a suction line, and said at least one valve device comprises two three-way valves, the first located in said suction line and the second located in said pressure line, said suction line having one of its ends attached to said fluid pumping means and said pressure line also having one of its ends connected to said fluid pumping means, whereby said at least one hollow body is adapted to be inflated by placing said first three-way valve at the first setting and the second three way valve at the second setting, and, in reversing the two possible settings of the three-way valves, the fluid pumping means acts to draw the fluid from the inflatable hollow body and pass it to the lower pressure area.

8. An apparatus according to claim 5 further comprising a microcomputer system adapted to regulate the functions of said pressure measuring device, said shut off valve and said at least one valve device.

9. An apparatus according to claim 8 further comprising indicator means for indicating the stored product quantity.

10. An apparatus as in claim 5 further comprising at least one dimensionally stable, gas and liquid-permeable envelope having a constant dry capactiy, said envelope surrounding said at least one hollow body and fixed within the interior of said container.

11. An apparatus as recited in claim 10 having four of said envelopes, each containing a hollow body, a common carrier securing said four envelopes together, said second gas line first end in fluid communication with one of said four hollow bodies, and a third, fourth and fifth gas line each having a first end in fluid communication with a respective one of the three remaining hollow bodies and a second end in fluid communication with a common conduit which is itself in fluid communication with said fluid pumping means, said third, fourth and fifth gas lines each having one of said valve devices therein.

12. An apparatus as recited in claim 11 wherein each of the four envelopes is a cylindrical tube extending essentially parallel to the bottom surface of said container and each of said hollow bodies is adapted to expand in the associated one of said cylindrical tubes to a state of maximum expansion which conforms to the internal dimensions of said associated one of said cylindrical tubes.

13. An apparatus as recited in claim 12 wherein the hollow bodies are all of the same size.

14. An apparatus as recited in claim 12 wherein each of said three-way valves is regulated by a microcomputer system.

15. An apparatus as recited in claim 5 further comprising at least one flexible gas line having a first end connected to said at least one hollow body and a second end connected to said second gas line first end so as to provide fluid communication means between said at least one inflatable body and the first end of said second line, said at least one hollow body being adapted to rest on the upper surface of the product stored in said container.

16. A method of determining the quantity of a liquid or solid product stored in a container having a known volume Vc, said method comprising:
bringing the interior of the container to a known reference pressure P1;
inflating an inflatable hollow body completely enclosed within the container to a known, predetermined volume Vb;
measuring the pressure P2 within the container after inflation of the hollow body;
determining the quantity Q of the product from Boyle's law, based on P1, P2, Vc and Vb.

* * * * *